(12) United States Patent
Geminn et al.

(10) Patent No.: US 9,394,813 B2
(45) Date of Patent: Jul. 19, 2016

(54) EXHAUST-GAS HEAT EXCHANGER

(71) Applicant: TENNECO GMBH, Edenkoben (DE)

(72) Inventors: Markus Geminn, St. Martin (DE); Andreas Steigert, Lambrecht (DE); Margit Roth, Freimersheim (DE); Marcel Womann, Neustadt/Weinstrasse (DE); Alexander Jochem, Edenkoben (DE)

(73) Assignee: TENNECO GMBH, Edenkoben (DE)

( * ) Notice: Subject to any disclaimer, the term of this patent is extended or adjusted under 35 U.S.C. 154(b) by 0 days.

(21) Appl. No.: 14/371,455

(22) PCT Filed: Aug. 26, 2013

(86) PCT No.: PCT/EP2013/067597
§ 371 (c)(1),
(2) Date: Jul. 10, 2014

(87) PCT Pub. No.: WO2014/033075
PCT Pub. Date: Mar. 6, 2014

(65) Prior Publication Data
US 2015/0152762 A1 Jun. 4, 2015

(30) Foreign Application Priority Data
Aug. 28, 2012 (DE) .......................... 10 2012 107 908

(51) Int. Cl.
*F01N 13/08* (2010.01)
*F01N 3/02* (2006.01)
(Continued)

(52) U.S. Cl.
CPC ................ *F01N 3/0205* (2013.01); *F01N 5/02* (2013.01); *F28D 7/103* (2013.01); *F28D 7/106* (2013.01); *F28D 21/0003* (2013.01); *F28F 27/02* (2013.01); *F01N 2240/02* (2013.01);
(Continued)

(58) Field of Classification Search
CPC ..... F01N 1/165; F01N 1/166; F01N 2470/02; F01N 2470/04; F01N 2470/24; F01N 1/16–1/18; F01N 1/22; F02M 35/1222
See application file for complete search history.

(56) References Cited

U.S. PATENT DOCUMENTS 3,280,903 A * 10/1966 Stoddard, Jr. ................. 165/135
3,997,002 A    12/1976 Baker et al.
5,435,347 A *  7/1995 Gillingham ............. 137/599.09

FOREIGN PATENT DOCUMENTS

DE  10 2010 039 281 A1   6/2011
EP       0 519 778 A1   12/1992
(Continued)

*Primary Examiner* — Jonathan Matthias
(74) *Attorney, Agent, or Firm* — Hudak, Shunk & Farine Co. LPA

(57) ABSTRACT

An exhaust-gas heat exchanger for an exhaust system for cooling an exhaust-gas flow, having an inner pipe and an outer pipe, wherein the two pipes are indirectly or directly welded to one another in sealing fashion at the inlet side, a jacket pipe is arranged around the outside of the outer pipe and an annular gap for coolant is arranged between the outer pipe and the jacket pipe, and the inner pipe has an axial flow cross section (A2) at the end as viewed in the flow direction (S) and has a perforation (P2), which forms a radial flow cross section, in a direction at right angles to a flow direction (S). Between the inner pipe and the outer pipe there is formed an exhaust-gas duct for the exhaust-gas flow, wherein an intermediate pipe which is mounted in displaceable and/or rotatable fashion on the inner pipe is provided with a perforation (P4) by which the axial flow cross section (A2) of the inner pipe can be at least partially closed off.

13 Claims, 3 Drawing Sheets

(51) Int. Cl.
　　　*F01N 5/02*　　　(2006.01)
　　　*F28F 27/02*　　(2006.01)
　　　*F28D 7/10*　　　(2006.01)
　　　*F28D 21/00*　　(2006.01)

(52) U.S. Cl.
　　　CPC ....... *F01N2240/36* (2013.01); *F01N 2260/024* (2013.01); *F01N 2470/02* (2013.01); *F01N 2470/04* (2013.01); *F01N 2470/24* (2013.01); *Y02T 10/121* (2013.01); *Y02T 10/16* (2013.01); *Y02T 10/20* (2013.01)

(56) References Cited

FOREIGN PATENT DOCUMENTS

| | | |
|---|---|---|
| EP | 1 555 421 A2 | 7/2005 |
| EP | 1 884 634 A2 | 2/2008 |
| EP | 1 388 720 B1 | 5/2012 |
| GB | 1 170 584 | 11/1969 |
| JP | 2008-101479 A | 5/2008 |
| JP | 2010-31671 A | 2/2010 |

\* cited by examiner

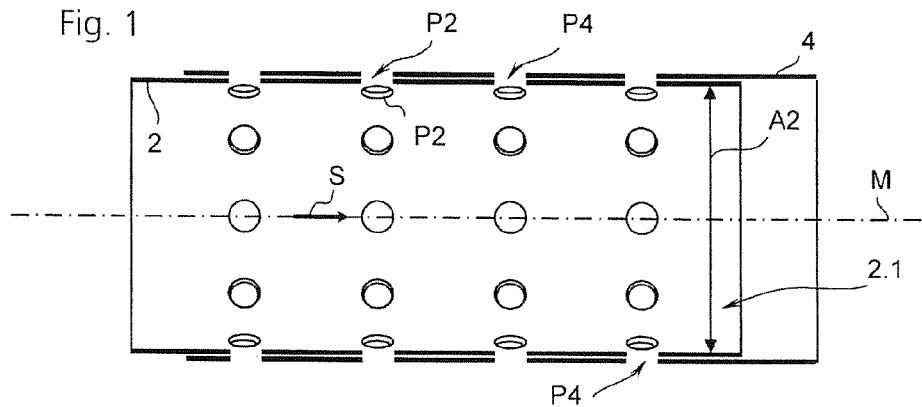
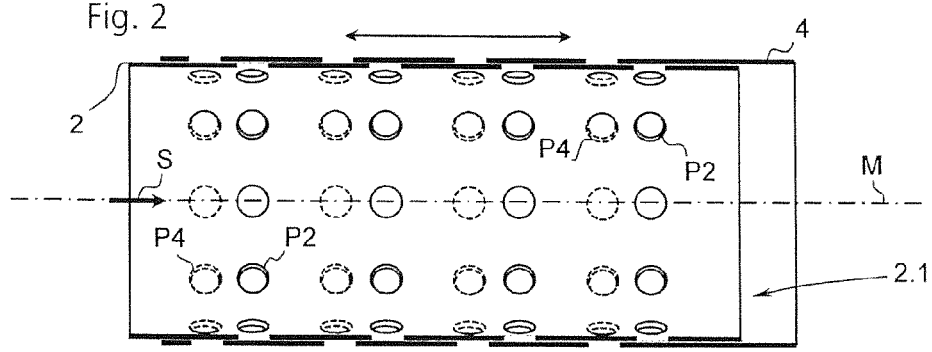
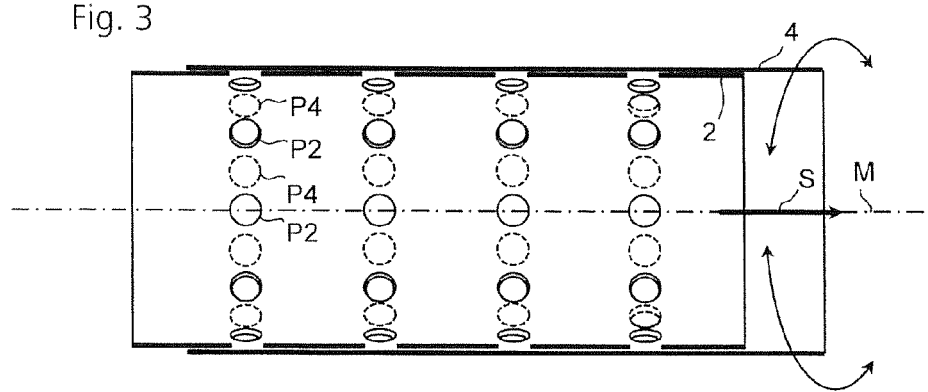

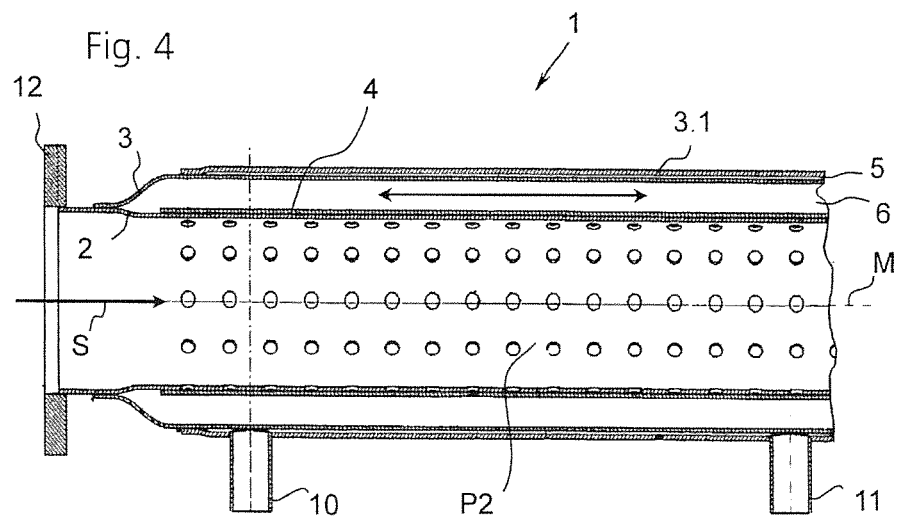
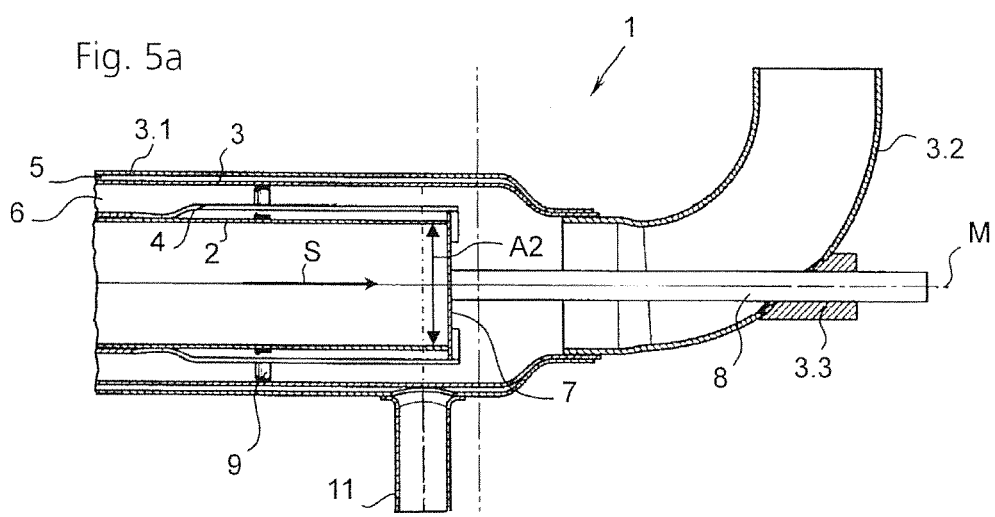
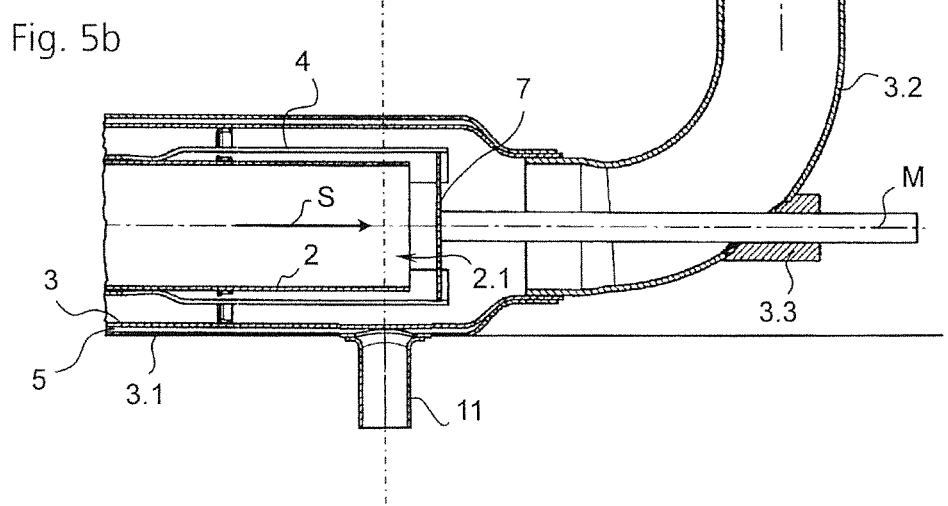

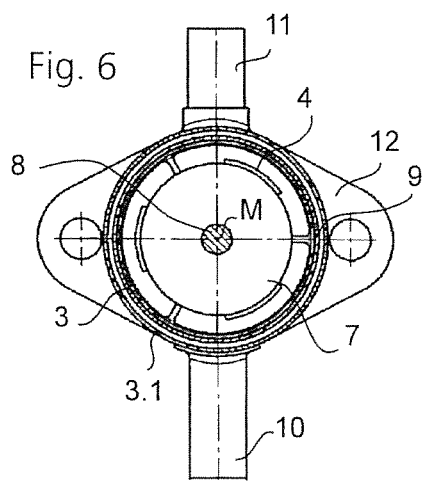
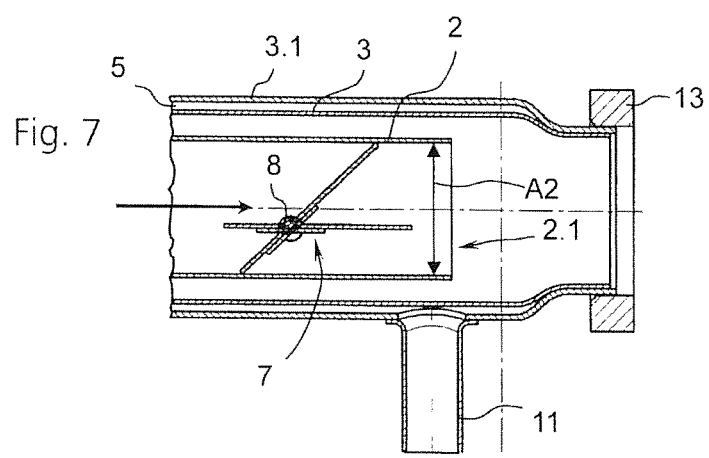
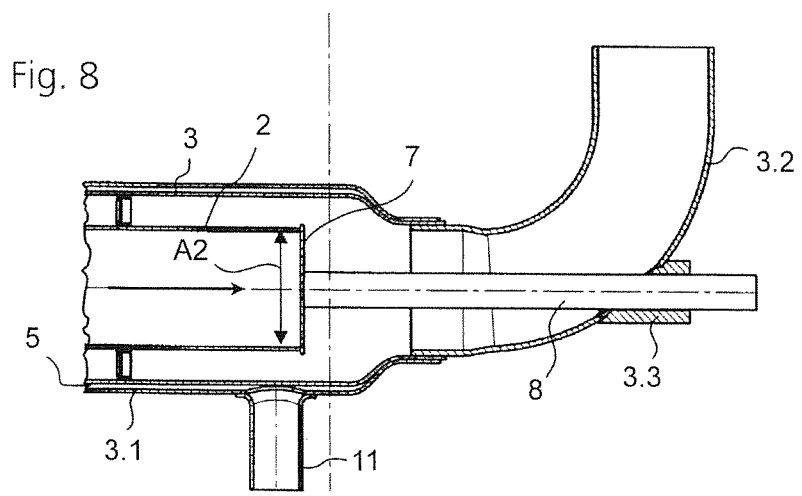

EXHAUST-GAS HEAT EXCHANGER

FIELD OF THE INVENTION

The invention relates to an exhaust-gas heat exchanger for an exhaust system for cooling an exhaust-gas flow. The exhaust-gas heat exchanger has an inner pipe and an outer pipe, wherein the two pipes are indirectly or directly welded to one another in sealing fashion at the inlet side. Between the inner pipe and the outer pipe there is formed an exhaust-gas duct for the exhaust-gas flow. A jacket pipe is arranged around the outside of the outer pipe and an annular gap for coolant is arranged between the outer pipe and the jacket pipe. The inner pipe has an opening with an axial flow cross section at the end as viewed in the flow direction and a perforation with an equivalent radial flow cross section in a direction at right angles to a flow direction.

BACKGROUND OF THE INVENTION

Exhaust-gas heat exchanges of this kind are described in EP 1 555 421 A2 and JP 2010/31671 A, according to which the Inner pipe has a perforation and the axial flow cross section can be closed by a valve, so that the exhaust-gas flow can be guided through the inner pipe and/or across the exhaust-gas heat exchanger in the outer pipe.

In DE 10 2010 039 281 A1 a similar waste heat recovery device is described with central throttle valve, by which the mass flow is regulated in the central passage line and in the bypass line.

JP 2008-101479 A likewise describes a device for heat exchange in an exhaust-gas flow, which is regulated by a central throttle valve. Cooling is done in the countercurrent method.

SUMMARY OF THE INVENTION

The problem of the invention is to ensure a simple arrangement of an exhaust-gas heat exchanger by which the precise amounts of thermal energy can be withdrawn from the exhaust-gas flow by a coolant.

The problem is solved according to the invention in that an intermediate pipe with a perforation is mounted on the inner pipe such that it can be displaced or rotated, and the perforation forms an equivalent radial flow cross section, and the intermediate pipe can at least partly close off the perforation of the inner pipe and alter the radial flow cross section. The intermediate pipe serves as a kind of slide valve for opening and closing the holes forming the perforation in the inner pipe.

In this way, the exhaust-gas flow can be taken almost entirely through the inner pipe and through the opening without a flow through the perforations and thus without further cooling in the outer pipe. Conversely, in a further step, it would be possible to direct the exhaust-gas flow almost completely through the perforation for heat exchange to the outer pipe and to close off the inner pipe completely in the axial direction.

The exhaust-gas heat exchanger according to the invention is integrated in the outer pipe and can be installed in linear fashion in an exhaust-gas line. For this, the exhaust-gas heat exchanger according to the invention has an inlet and an outlet flange, which are arranged coaxially to the center axis. Accordingly, it is ensured that the inner pipe ends before the outer pipe in the flow direction and the intermediate pipe is shorter than the inner pipe. For the aforementioned reversed flow variant, it is advantageous that the opening can be at least partly closed off by an adjustable device and the axial flow cross section can be altered. The device is preferably switchable in design, as a lid or valve which is actively or passively controlled via a switching element.

Just like the device, the intermediate pipe can also be switched via the same or a different switching element.

It is of special advantage when the axial flow cross section of the opening and the radial flow cross section of the perforation of the inner pipe can be changed at the same time. This simplifies the regulating process and the preferred variant in regard to an almost complete halting of the exhaust-gas flow in axial or radial direction is most easily achieved.

It is also advantageous when the perforation of the intermediate pipe at least partly overlaps with the perforation of the inner pipe or the two radial flow cross sections formed by the perforations are nearly identical. When the perforations exactly coincide, the least noise occurs in the exhaust-gas heat exchanger because exactly coinciding holes of the perforations form no edges in the flow. For this, it is advantageous to at least partly break or round off the edges of the holes of the perforations circumferentially, in order to prevent noise.

In regard to the switching process, it is advantageous for the intermediate pipe to be driven so that it can rotate about a center axis and/or shift in the direction of the center axis. Preferably, the intermediate pipe is either rotated or displaced, not both at the same time.

It is especially advantageous when the device and the intermediate pipe are configured as a subassembly, so that the intermediate pipe and the device can be moved at the same time by the switching element. In particular, the shifting of the intermediate pipe in the axial direction can be very easily combined with a lid for closing the inner pipe, as a subassembly.

In regard to this variant, it is especially advantageous that the switching element is led from the outside through the outer pipe or through a pipe adjoining the outer pipe and coupled to a drive unit. In this way, the subassembly is fashioned as a single part.

In one particular sample embodiment, the intermediate pipe is mounted by bearing elements or bearing means on the inner pipe. For this, plain bearing rings are provided on the inner pipe in the region of the ends of the intermediate pipe, on which the intermediate pipe slides. The bearing elements or bearing means serve at the same time as sealing means.

It is especially advantageous when the radial flow cross section as the sum of the areas of all holes forming the perforation of the inner pipe corresponds at least to 1.2 to 1.7 times the axial flow cross section of the opening of the inner pipe. In this way, the hydrodynamic back pressure is minimized at maximum power of the heat exchanger.

It is also advantageous when the switching element can be controlled actively or passively by an exhaust-gas back pressure created by the exhaust-gas flow or by an actuator. A passive control is achieved in that the system controls itself. The changing of the flow cross sections occurs, for example, as a function of the exhaust-gas back pressure, without any active and direct positioning of the intermediate pipe or the device via a control unit. Such a self-control is also known as semi-active.

The solution according to the invention is to be understood in its process as follows: a method for regulating an exhaust-gas flow in an exhaust-gas heat exchanger in an exhaust system, wherein the exhaust-gas heat exchanger has an inner pipe and an intermediate pipe mounted on the inner pipe, the Inner pipe and the intermediate pipe each have a perforation with a radial flow cross section in the radial direction of the center axis.

The intermediate pipe is mounted so that it can rotate or move relative to the inner pipe and the quantity of the exhaust-gas flow that flows in the radial direction through the perforations of the inner pipe in the direction of an exhaust-gas duct is regulated by moving the intermediate pipe.

This method is preferably implemented with an exhaust-gas heat exchanger, as specified above.

A preferred solution can be achieved when the quantity of the exhaust-gas flow which flows in the axial direction through the opening of the inner pipe arranged downstream from the perforation is regulated by moving a device, wherein the intermediate pipe and the device are moved at the same time.

BRIEF DESCRIPTION OF THE DRAWINGS

Further benefits and details of the invention are explained in the specification and depicted in figures. There are shown:

FIG. 1, a diagram of an inner pipe and an intermediate pipe in cross section with overlapping perforations;

FIG. 2, a sketch per FIG. 1 shifted in the axial direction in a positioning of the perforations that is not overlapping;

FIG. 3, a sketch per FIG. 1 rotated in the circumferential direction about the center axis, in a positioning of the perforations that is not overlapping;

FIG. 4, a portion of an exhaust-gas heat exchanger at the inlet end;

FIG. 5a, a first sample embodiment of a portion of an exhaust-gas heat exchanger at the outlet end with a subassembly consisting of an intermediate pipe and a lid in closed position;

FIG. 5b, the sample embodiment of FIG. 5a in opened position;

FIG. 6, an axial view per section A-A' of FIG. 5a;

FIG. 7, a second sample embodiment of the outlet end of an exhaust-gas heat exchanger with a switchable valve;

FIG. 8, a third sample embodiment of the outlet end of an exhaust-gas heat exchanger with a switchable lid;

DETAILED DESCRIPTION OF THE INVENTION

The figures depict an exhaust-gas heat exchanger 1 of this kind with an exhaust pipe formed by an inner pipe 2 and an exhaust-gas duct 6 formed between the inner pipe 2 and an outer pipe 3, wherein the exhaust-gas flow goes through the inner pipe 2 into the exhaust-gas heat exchanger 1. The outer pipe 3 is formed as a double-wall with a jacket pipe 3.1. Between the outer pipe 3 and the jacket pipe 3.1 is provided an annular gap 5 for coolant. A solution is described for regulating the amount of the exhaust-gas flow on the one hand from the inner pipe 2 in the axial direction through an opening 2.1 at the end and on the other hand in the axial direction through a perforation P2 of the inner pipe 2 into the exhaust-gas duct 6.

FIGS. 1 to 3 show a segment of a diagram of an intermediate pipe 4 mounted on the inner pipe 2. The two pipes 2, 4 are arranged coaxially about a center axis M. The intermediate pipe 4 is open at both ends. The inner pipe 2 according to FIG. 4 is joined at the inlet side to the outer pipe 3 at left and has at the opposite, outlet end, at right, an opening 2.1 with an inner axial Flow cross section A2. Furthermore, the inner pipe 2 has, in the radial direction to the center axis M, the perforation P2 consisting of a plurality of holes and the intermediate pipe 4 has a similar perforation P4, overlapping in the radial direction. The two perforations P2, P4 each form an equivalent radial flow cross section.

In the inner pipe 2 the exhaust-gas stream (not otherwise designated) flows in a general flow direction S. The Intermediate pipe 4, as shown by the arrows, is mounted on the inner pipe 2 so that it can be displaced in the axial direction without major play to the inner pipe 2 and rotated about the center axis M. The amount of the exhaust-gas stream flowing in the flow direction S that is supposed to flow in the radial direction through the perforations P2, P4 can be regulated directly by the displaceable and rotatable intermediate pipe 4.

Once the perforations P2, P4 of the two pipes 2, 4 are lined up congruently to each other, the maximum amount of the exhaust-gas stream flows in the radial direction through the inner pipe 2 and through the intermediate pipe 4 to the outside into the exhaust-gas duct 6 formed between the inner pipe 2 and the outer pipe 3. In one position of the intermediate pipe 4 to the inner pipe 2, as depicted in one of FIGS. 2 and 3, the portion of the exhaust-gas flow in the radial direction is totally blocked, no exhaust gas flows in the radial direction through the inner pipe 2 and the intermediate pipe 4 into the exhaust-gas duct 6. In the possible intermediate positions between the situation depicted in FIG. 1 and the situations depicted in FIGS. 2 and 3, the exhaust-gas flow can be regulated in its amount in the radial direction.

According to FIGS. 4 to 6, there is arranged in addition at the end of the inner pipe 2 in the axial direction a device 7 for closing the opening 2.1, i.e., the axial flow cross section A2 of the inner pipe 2.

FIG. 4 shows an inlet portion of an exhaust-gas heat exchanger 1 with a double-wall outer pipe 3 with a flange 12 at the inlet end. This part of the exhaust-gas heat exchanger 1 can be combined with various solutions which enable the closing of the opening 2.1 of the inner pipe 2 with a device 7 and the closing of the intermediate pipe 4. Such solutions are depicted in FIGS. 5a to 8. According to FIG. 4, the inner pipe 2 and the intermediate pipe 4 are contained in the double-wall outer pipe 3. At the inlet end, the three pipes 2, 3, 4 are joined together directly or indirectly.

According to this sample embodiment, the perforations P2, P4 of the inner and intermediate pipe 2, 4 are overlapping, so that the amount of the exhaust-gas flow in the radial direction can be maximized after changing the flow cross section in the axial direction. The portion of the exhaust-gas flow that is led through the exhaust-gas duct 6 formed between the inner pipe 2 and the intermediate pipe 4 flows past the inside of the outer pipe 3 and transfers the heat.

The outer pipe 3 is double-wall, in that the jacket pipe 3.1 is arranged around the outer pipe 3 and thus an annular gap 5 is formed between the outer pipe 3 and the jacket pipe 3.1, in which a fluid flows as coolant. The fluid is brought into circulation via two nozzles 10, 11 connected to the annular gap 5 with a second exhaust-gas heat exchanger (not shown) and thus the heat is taken away from the exhaust-gas flow.

In the flow direction S various possibilities can be provided at the outlet end to change the flow cross section A2 in the axial direction through the inner pipe 2. The regulation of the radial part of the exhaust-gas flow through the intermediate pipe 4 can be done independently of the regulation of the axial part of the exhaust-gas flow.

According to one preferred sample embodiment which is the best solution for the problem, the regulations of the axial and radial components are coupled, so that the intermediate pipe 4 is adjusted at the same time with the device 7 for the axial flow cross section A2. The regulation makes possible conducting 0 to 100% of the exhaust-gas flow in the radial direction through the perforations P2, P4 and 100 to 0% in the axial direction through the overall Inner pipe 2.

According to FIGS. 5a and 5b, the device is provided as a lid 7 with a rod as the switching element 8, the lid 7 being joined to the intermediate pipe 4 in a subassembly grouping. The switching element 8 fashioned as a rod is connected to the lid 7 and arranged coaxially to the center axis M, around which at least the inner pipe 2 and the intermediate pipe 4 are also coaxially arranged. The outer pipe 3 and the jacket pipe 3.1 in this sample embodiment are likewise arranged coaxially to the center axis M.

The switching element 8 is led out through the wall of a curved pipe 3.2 adjoining the outer pipe 3 and mounted and sealed via a socket 3.3 provided on the pipe 3.2 in the direction of the center axis. Thanks to the switching element 8, the lid 7 is moved in the axial direction for the closing or opening of the axial flow cross section A2 and at the same time as the lid 7 the intermediate pipe 4 is moved to open and close the perforation P2 in the inner pipe 2.

According to FIG. 5a, the inner pipe 2 is closed in the axial direction by the lid 7 across the entire axial flow cross section A2 and the entire exhaust-gas stream can flow in the axial direction corresponding to the representation in FIG. 1 through the perforations P2, P4 out from the inner pipe 2. The perforations P2, P4 of the inner pipe 2 and intermediate pipe 4 are congruent. As soon as the lid 7 is moved from the closed position of FIG. 5a into the open position of FIG. 5b, the inner pipe 2 is opened across its axial flow cross section A2. At the same time, the intermediate pipe 4 per FIG. 2 is displaced into a position in which the perforation P2 on the inner pipe 2 is closed by the region of the intermediate pipe 4 and no holes are provided for the perforation P4. The exhaust-gas stream thus flows only in the axial direction out from the inner pipe 2.

FIG. 6 shows a top view of a lid 7 of an exhaust-gas heat exchanger 1, resembling the exhaust-gas heat exchanger 1 of FIGS. 5a and 5b. In the sample embodiment shown here, the intermediate pipe 4 is mounted via a bearing 9 in the outer pipe 3. Furthermore, the intermediate pipe 4 is greater in diameter in the region of the bearing 8 up to the lid 7 than in the region of t he perforation P4, so that a segment-shaped seat for the lid can be formed encircling the lid 7. In this sample embodiment, the two sockets 10, 11 are arranged opposite, however.

According to FIG. 7, a switchable valve is arranged in the inner pipe 2 as the device 7, which can be regulated independently of the intermediate pipe 4 from outside the exhaust-gas heat exchanger 1 by a switching element (not shown). In this sample embodiment, the switching element 8 for the valve 7 is led through the outer pipe 3 and the jacket pipe 3.1. The outer pipe 3 is joined in the axial direction to the center axis M by another flange 13 to an exhaust system (not shown). According to the sample embodiment of FIG. 8, a lid 7 is provided with the switching element 8, by which the amount of the exhaust-gas stream flowing in the axial direction through the inner pipe 2 is regulated independently of the intermediate pipe 4.

What is claimed is:

1. An exhaust-gas heat exchanger for an exhaust system for cooling an exhaust-gas flow comprising: an inner pipe and an outer pipe, wherein
   a) the two pipes are indirectly or directly welded to one another in sealing fashion at an inlet side,
   b) between the inner pipe and the outer pipe there is formed an exhaust-gas duct for the exhaust-gas flow,
   c) a jacket pipe is arranged around an outside of the outer pipe and an annular gap for coolant is arranged between the outer pipe and the jacket pipe,
   d) the inner pipe has a perforation (P2) with a radial flow cross section in a direction at right angles to a flow direction (S) and an opening with an axial flow cross section (A2) at an end of the inner pipe as viewed in the flow direction (S),
   e) an intermediate pipe with a perforation (P4) is provided on the inner pipe such that it can be displaced or rotated, and the intermediate pipe perforation (P4) forms a radial flow cross section that is equivalent to the inner pipe perforation (P2) radial flow cross section,
   f) the intermediate pipe can at least partly close off the perforation (P2) of the inner pipe and alter the radial flow cross section, and
   g) wherein an adjustable device is provided for at least partly closing off the opening and altering the axial flow cross section (A2), wherein the adjustable device and the intermediate pipe are configured as a subassembly, and a switching element is provided, by which the intermediate pipe and the adjustable device can only be moved at the same time.

2. The exhaust-gas heat exchanger according to claim 1, wherein the axial flow cross section (A2) of the opening and the radial flow cross section of the perforation (P2) of the inner pipe can be changed at the same time.

3. The exhaust-gas heat exchanger according to claim 1, wherein the perforation (P4) of the intermediate pipe at least partly overlaps with the perforation (P2) of the inner pipe.

4. The exhaust-gas heat exchanger according to claim 1, wherein the intermediate pipe can rotate about a center axis (M) and/or shift in the direction of the center axis (M).

5. The exhaust-gas heat exchanger according to claim 1, wherein the radial flow cross section as the sum of the areas of all holes forming the perforation (P2) of the inner pipe corresponds at least to a value of 1.2 times the axial flow cross section (A2) of the inner pipe.

6. The exhaust-gas heat exchanger according to claim 1, wherein the switching element is controlled actively or passively by an exhaust-gas back pressure created by the exhaust-gas flow or by an actuator.

7. The exhaust-gas heat exchanger according to claim 1, wherein the perforation (P4) of the intermediate pipe at least partly overlaps with the perforation (P2) of the inner pipe and/or the two radial flow cross sections are identical.

8. The exhaust-gas heat exchanger according to claim 7, wherein the intermediate pipe can rotate about a center axis (M) and/or shift in the direction of the center axis (M).

9. The exhaust-gas heat exchanger according to claim 8, wherein the device and the intermediate pipe are configured as a subassembly, and a switching element is provided, by which the intermediate pipe and the device can be moved at the same time.

10. The exhaust-gas heat exchanger according to claim 9, wherein the radial flow cross section as the sum of the areas of all holes forming the perforation (P2) of the inner pipe corresponds at least to a valve of 1.2 times the axial flow cross section (A2) of the inner pipe.

11. The exhaust-gas heat exchanger according to claim 10, wherein the switching element can be controlled actively or passively by an exhaust-gas back pressure created by the exhaust-gas flow or by an actuator.

12. The exhaust-gas heat exchanger according to claim 1, wherein the two radial flow cross sections are identical.

13. A method for regulating an exhaust-gas flow in an exhaust- gas heat exchanger in an exhaust system, wherein the exhaust-gas heat exchanger has an inner pipe and an intermediate pipe mounted on the inner pipe, the inner pipe and the intermediate pipe each have a perforation (P2, P4)

with a radial flow cross section in a radial direction of a center axis (M), comprising the steps of;

mounting the intermediate pipe so that it can rotate or move relative to the inner pipe, regulating the quantity of the exhaust-gas flow that flows in the radial direction through the perforation (P2) of the inner pipe in the direction of an exhaust-gas duct by moving the intermediate pipe, and regulating the quantity of the exhaust-gas flow which flows in the axial direction through an opening of the inner pipe arranged downstream from the perforation (P2) in a flow direction (S) by only moving an adjustment device, wherein the intermediate pipe and the adjustment device are mechanically coupled and moved at the same time.

* * * * *